United States Patent Office 3,215,608
Patented Nov. 2, 1965

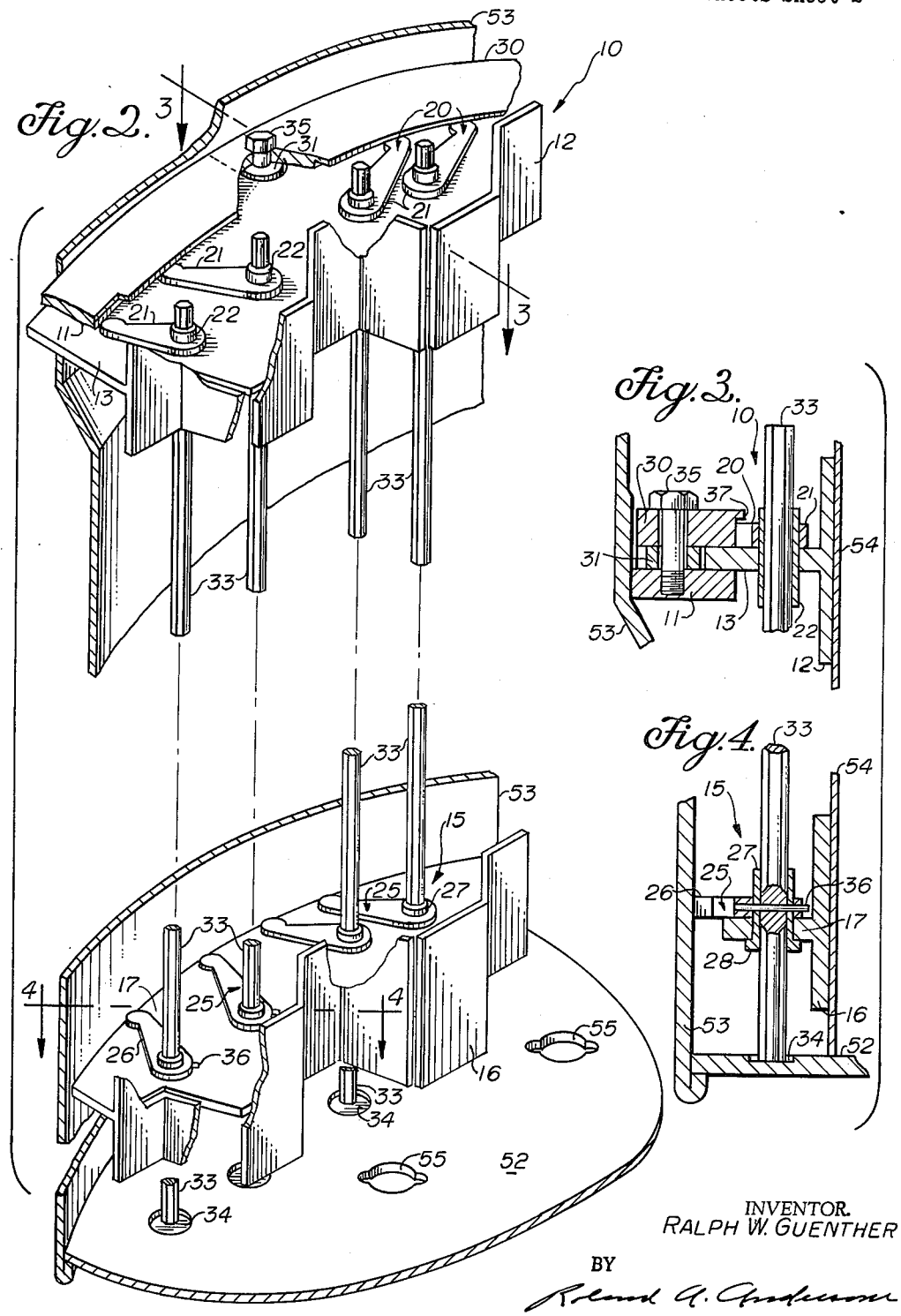

3,215,608
NUCLEAR REACTOR CORE CLAMPING SYSTEM
Ralph W. Guenther, San Jose, Calif., assignor to the United States of America as represented by the United States Atomic Energy Commission
Filed Feb. 19, 1965, Ser. No. 434,150
5 Claims. (Cl. 176—87)

This invention relates to nuclear reactors and in particular to a method of clamping or holding fuel elements together to form a unified core having improved characteristics for neutron reflector control.

Where, in the case of some fast neutron reactors, neutron reflectors are employed for control, it is desirable to maintain as closed a proximity of the reflector element to the core in order to eliminate as much neutron absorbing material between the core and reflector as possible. For reactor cores of relatively large size and operating at increasingly higher temperatures, account must be taken of the combined and separate thermal expansion of the individual fuel elements. In addition, when relatively thin and light weight construction of fuel elements are used to reduced neutron absorption within the reactor core, the compression forces against the fuel element must be carefully controlled to maintain proper narrow clearances, i.e., close tolerances to permit even and controlled reactivity throughout the core yet not so great as to permit crushing of the fuel element cladding or structure upon thermal expansion of the core. Thus, mere straps and other devices of the prior art fitted around the core for the purpose of bundling the fuel elements together will be unsatisfactory for use in current state of the art fast neutron reactors. Nor are devices, such as end plates in which the fuel elements are affixed, satisfactory, even allowing for thermal expansion, in that core thermal expansion affords a certain degree of reactor control. The volume thermal expansion of the fuel elements at points around the periphery of the core should be equal; unequal expansion of the core would result in the undesirable situation of regions of unequal reactivity within the core.

The core clamping system of this invention is thus an improvement over prior art devices in that it not only allows for expansion of the reactor core, but is, additionally, separately adjustable about the periphery of the core as to the radial forces against the local fuel elements without involving spacious and cumbersome parts which would cause great separation between the core and the neutron reflectors between which the clamping system is situated.

It is therefore an object of this invention to provide a clamping system for the core of a nuclear reactor.

It is a further object of this invention to provide a clamping system for a nuclear reactor core that is individually adjustable as to radial pressure and as to separate segments about the periphery of the core.

It is still another object of this invention to provide a clamping system for the core of a nuclear reactor having a neutron reflector control system wherein said clamping system is situated between said core and said reflector system and is of such a size to permit closer spacing of said reflector system to said core.

Other and more particular objects of this invention will be manifest upon study of the following detailed description when taken together with the accompanying drawings, in which:

FIGURE 2 is an isometric view of the clamping system showing the configuration at the top and bottom of the reactor core;

FIGURE 3 is a section through the upper portion of the clamping system taken at line 3—3; and FIGURE 4 is a section through the lower portion of the clamping system taken at line 4—4.

Figure 1:
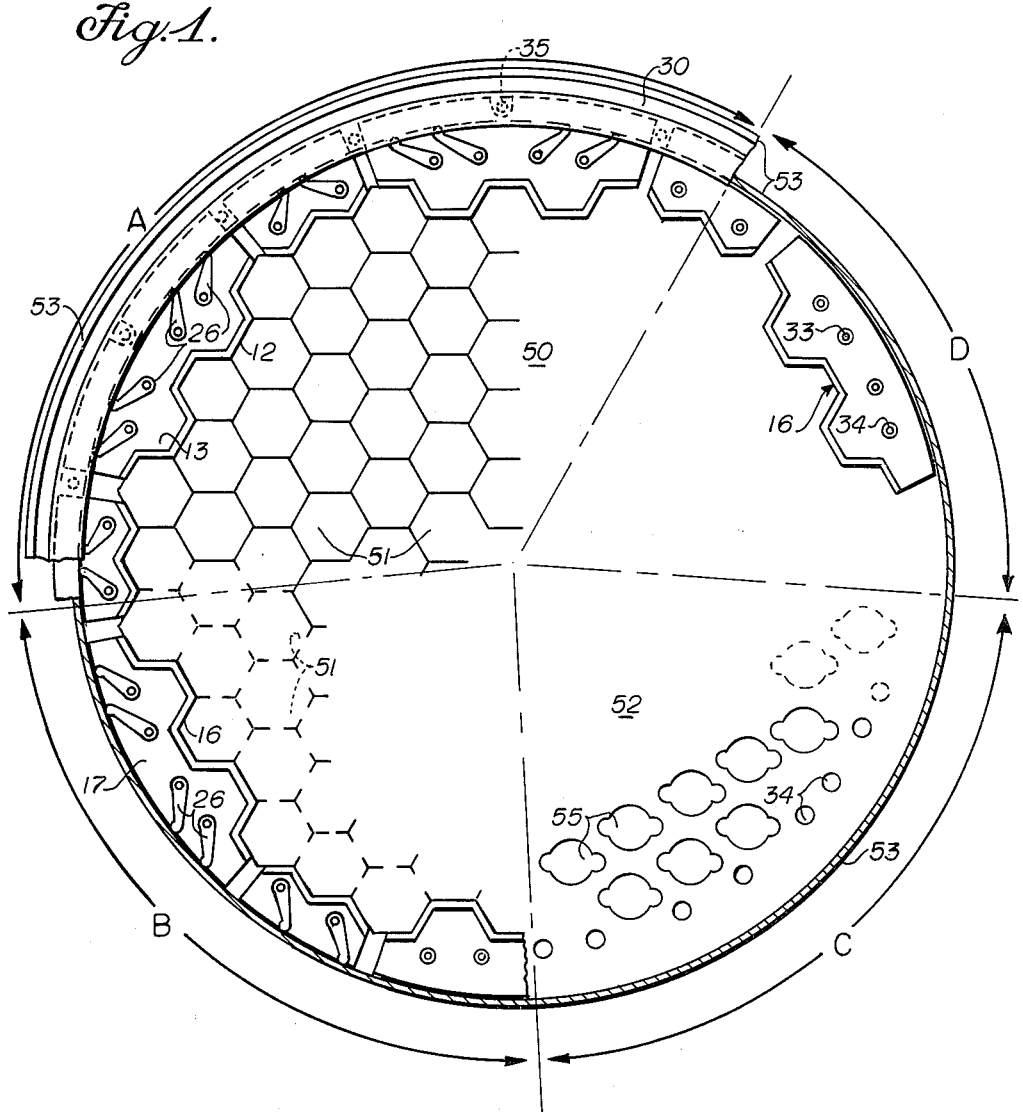
FIGURE 1 is a progressively sectioned view through a nuclear reactor core utilizing the clamping system of this invention and illustrating the general configuration of the clamping system about the periphery of the reactor core.

Reactor cores with which the clamping system of the invention can be employed are generally of right cylindrical configuration and may be comprised of blocks and/ or elongated rod-like fuel elements so that the periphery may be of contiguous circular segments. However, the core may also be comprised of a plurality of polyhedral elongated moderator and/or fissile fuel elements arranged in contiguous parallel array with the periphery then being of a segmented convoluted or corrugated configuration. Reactor core 30 illustrated in FIGURE 1 is comprised of a plurality of contiguous hexagonal reactor core elements as employed, for example, in a fast neutron reactor adaptable for reflector control and accordingly presents a periphery of hexagonal segmented corrugations.

The general configuration of the clamping system of this invention about the periphery of the reactor core 30 is illustrated in FIGURE 1.

Section A is a partial section through the upper portion of reactor core 50 showing the upper portion of the fuel clamping system comprising an upper shoe assembly 10 and upper guide ring 11 holding the upper portion of fuel elements in place.

Section B is a partial section through the lower portion of the reactor immediately above lower shoe assembly 15 holding the lower portion of fuel elements 51 in place.

Section C is a partial section through the bottom of the reactor core immediately above fuel element support plates 52, showing apertures 55 for fuel elements 51 and torsion rod support recess 34.

Section D is a partial section through the reactor core immediately below lower shoe assembly 15 showing a section through both lower shoe pressure plate 16 and torsion rod 33 resting in torsion rod support recess 34.

It can be seen by reference to FIGURES 1 and 2 that upper shoe assembly 10 and lower shoe assembly 15 are fitted respectively with upper shoe pressure plate 12 and lower shoe pressure plate 16 shaped to fit the corrugated periphery presented by fuel elements 51 and arranged to apply pressure radially about the core to said fuel elements. A plurality of said upper and lower plates 12 and 16 respectively in effect provide a segmented pressure plate band about the periphery of core 50 and likewise a plurality of assemblies 10 and 15 are each arranged in a generally circular configuration about said core. Alternating, assemblies are provided with 2 and 4 torsion members, respectively. The method of producing said pressure is described hereinafter.

Referring to FIGURE 2, each upper shoe assembly 10 comprises an upper shoe pressure plate 12 mounted vertically and affixed as by welding, brazing or the like to horizontally mounted upper shoe bearing plate 13. In a similar configuration, each lower shoe assembly 15 comprises a lower shoe pressure plate 16 mounted vertically, of identical shape as upper shoe assembly 10 and aligned with said assembly 10, and affixed as by welding, brazing or the like to horizontally mounted lower shoe bearing plate 17. Each shoe assembly is accordingly arranged to be free to move horizontally and radially with respect to the reactor core and paired upper and lower shoe assemblies are arranged to provide a mutually cooperating locking structure as set forth hereinafter.

More particularly, upper shoe assembly 10 is restrained from moving vertically by virtue of upper bearing ring 30 in combination with upper guide ring 11 spaced apart by spacer sleeve 31 (FIGURE 3) between which rings, in slideable relation, is disposed upper shoes bearing plate 13. Lower shoe assembly 15 is restrained from moving vertically by the configuration shown in FIGURE 4. Lower moment arm journal sleeve 27 fitted over torsion rod 33 is provided with flange 28 upon which bears lower shoe bearing plate 17. Journal sleeve 27 is prevented from sliding up or down torsion rod 33 by use of shear pin 36 passing through both journal sleeve 27 and torsion rod 33. In both upper shoe assembly 10 and lower shoe assembly 15, upper moment arm 21 and lower moment arm 26 are respectively affixed as by welding or the like to upper moment arm journal sleeve 22 and by pin 36 in the case of lower moment arm journal sleeve 27. The inner configuration of each journal sleeve is arranged to conform to the geometry of torsion rod 33, shown in the present embodiment as a hexagon, to act on said torsion rod 33 in the manner of a wrench. It can be seen that a similar result would also be achieved using a splined or the like rod and sleeve in order to prevent rotation of the moment arm and sleeve relative to the torsion rod.

Upper and lower paired assembly members are installed, pair by pair, to provide the clamping system of this invention in the reactor. A lower journal sleeve 27 is first fitted over torsion rod 33 followed by lower shoe bearing plate 17, with lower shoe pressure plate 16 attached, and fitted over journal sleeve 27 in turn followed by lower moment arm 26 fitted over journal sleeve 27 on top of bearing plate 17. Pin 36 is then inserted to hold all parts in place. Torsion rod 33 is then lowered into a core containment vessel 53 such that the bottom of said rod fits in torsion rod support recess 34 provided in bottom member 52 of said vessel 53. Said recess 34, it can be seen, is made large enough in lateral dimension to permit movement of the rod as will occur upon expansion and contraction of the core 50. Next upper guide ring 11 is affixed to the upper inner periphery of containment vessel 53 by bolts, brackets, welding or the like of sufficient strength to support upper shoe assembly 10 and upper bearing ring 30. Upper bearing plate 13 with upper ressure plate 12 attached is placed around torsion rod 33. Spacer sleeve 31 is then placed to receive bolt 35, which bolt is inserted and tightened after upper bearing plate 30 is placed in proper position over bearing plate 13 and spacer sleeve 31.

Once the clamping system is in place the fuel elements, etc., are inserted into the vessel core region and after all fuel elements are inserted in the vessel to provide the core, upper moment arm assembly 20 is fitted over each torsion rod 33 and lowered until journal sleeve 22 enters the hole in bearing plate 13. The moment arm assembly 20 is then rotated, causing a torsional spring stress in torsion rod 33, to a point permitting the end of moment arm 21 to clear lip 37 on bearing ring 30 whereupon moment arm assembly 20 is further lowered to permit moment arm 21 to fit under said lip 37. Moment arm 21 is then permitted to rotate under the torsional forces of rod 33 and bear against the inner surface of bearing ring 30. It can be seen that the torsional forces in rod 33 will also cause lower moment arm 26 to bear against the wall of containment vessel 53. It can also be seen that the vector addition of the torsional force of lower moment arm 26 against containment vessel 53 and the torsional force of upper moment arm 21 against bearing ring 30 will provide a clamping force directed radially against fuel elements 51 by upper and lower pressure plates 12 and 16 respectively and acting against fuel element wall 54. Naturally, a greater torsional force, as achieved by a greater rotation of upper moment arm assembly 20 prior to it being permitted to bear against bearing ring 30, will result in a greater radial force being exerted against fuel element 51. This clamping pressure against the core can be adjusted as required about the periphery of the core by selecting the original orientation of the moment arm assembly 20 with respect to the final clamping position. In operation, as reactor core 50 expands, upper and lower shoe assemblies 10 and 15 respectively will be forced radially outward. In upper shoe assembly 10, upper shoe bearing plate 13 will slide between upper bearing ring 30 and upper guide ring 11. The lower end of torsion rod 33 will move with lower shoe assembly 15 sliding in torsion rod support recess 34. Upper moment arm 21 and lower moment arm 26 will act in the manner of a pair of spring loaded pivoted levers spreading to a greater angle relative to each other as the core expands upon increasing in temperature and decreasing in angle relative to each other as the core contracts upon cooling. It can be seen also, that in operation, spacer sleeve 31 further acts to prevent tangential movement of the spacer system by restricting movement of upper shoe assembly 10 to a radial direction.

Although the foregoing embodiments have been described in detail, there are obviously many other embodiments and variations in configuration which can be made by a person skilled in the art without departing from the spirit, scope or principle of this invention. Therefore, this invention is not to be limited except in accordance with the scope of the appended claims.

What is claimed is:

1. In a nuclear reactor, a clamping system for fuel elements forming a generally cylindrical reactor core comprising an upper clamping ring assembly, a lower clamping bearing surface and a plurality of clamping elements disposed circumjacent said core, each of said clamping elements comprising a group of at least two torsion rods in parallel spaced alignment circumjacent said core, upper and lower moment arm means proximate each end of each of said torsion rods for creating torsional forces in said rods, said upper moment arm means bearing in one rotational direction against said upper clamping ring assembly and said lower moment arm means bearing in the opposite rotational direction against said lower clamping bearing surface, an upper shoe assembly proximate the upper end of said group of torsion rods and penetrated thereby and a lower shoe assembly proximate the lower end of said group of torsion rods and penetrated thereby, said upper and lower shoe assemblies bearing against periphery fuel elements of said core.

2. In nuclear reactor, a clamping system for fuel elements forming a generally cylindrical reactor core comprising an upper clamping ring assembly, a lower clamping bearing surface and a plurality of clamping elements disposed circumjacent said core, each of said clamping elements comprising at least two torsion rods in parallel spaced alignment circumjacent said core, upper and lower moment arm means proximate each end of said torsion rods for creating torsional forces in said rods, said upper moment arm means bearing against said upper clamping rings assembly creating torsional forces in one rotational direction and said lower moment arm means bearing against said lower clamping bearing surface creating torsional forces in the opposite rotational direction, an upper shoe assembly comprising a horizontal bearing plate and a vertical pressure plate proximate the upper end of said group of torsion rods and said horizontal bearing plate penetrated thereby, and a lower shoe assembly comprising a horizontal bearing plate and a vertical pressure plate proximate the lower end of said group of torsion rods, said horizontal bearing plate penetrated thereby, said pressure plate bearing radially inward against the periphery fuel elements of said core.

3. The apparatus as defined in claim 2 wherein said upper clamping ring assembly comprises an upper guide ring, an upper bearing ring, and a spacer sleeve between said guide ring and said bearing ring, fastening means rigidly holding said guide ring, spacer sleeve and bearing ring together with said horizontal bearing plate of said upper shoe assembly disposed in slideable relation between said guide ring and said bearing ring.

4. The apparatus as defined in claim 2 wherein said upper moment arm means comprises a lever arm, a lever arm journal sleeve affixed to said lever arm, said sleeve and in engageable relation with said torsion rod, said journal sleeve penetrating and in bearing relationship with said horizontal bearing plate of said upper shoe assembly.

5. In a nuclear reactor, a clamping system comprising a plurality of fuel elements arranged in a generally cylindrical array to form a reactor core, a generally cylindrical reactor containment vessel means enclosing said core, an upper clamping ring assembly affixed to said containment vessel means proximate the upper portion thereof, a plurality of clamping elements disposed circumjacent said core between said core and said containment vessel means, each of said clamping elements comprising a group of at least two torsion rods in parallel spaced alignment circumjacent said core and between said core and said containment vessel, upper and lower arm means proximate each end of each said torsion rods for creating torsional forces in said rods, said upper moment arm means bearing in one rotational direction against said upper clamping ring assembly and said lower moment arm bearing in the opposite rotational direction against the lower portion of said reactor containment vessel means, an upper shoe assembly proximate the upper end of said group of torsion rods and penetrated thereby and a lower shoe assembly proximate the lower end of said group of torsion rods and penetrated thereby, said upper and lower shoe assemblies bearing against peripheral fuel elements of said core.

References Cited by the Examiner

UNITED STATES PATENTS 3,011,962  12/61  Koch et al. _____ 176—28

FOREIGN PATENTS 1,177,317  12/58  France _____ 176—86
868,677   5/61   Great Britain _____ 176—85

CARL D. QUARFORTH, *Primary Examiner.*